(12) United States Patent
Harris et al.

(10) Patent No.: US 8,739,378 B2
(45) Date of Patent: Jun. 3, 2014

(54) PORTABLE MAGNETIC POSITIONING TOOL

(71) Applicants: Will Harris, Spring, TX (US); Gerald L. Dasbach, Spring, TX (US)

(72) Inventors: Will Harris, Spring, TX (US); Gerald L. Dasbach, Spring, TX (US)

( * ) Notice: Subject to any disclaimer, the term of this patent is extended or adjusted under 35 U.S.C. 154(b) by 30 days.

(21) Appl. No.: 13/657,197

(22) Filed: Oct. 22, 2012

(65) Prior Publication Data

US 2013/0058731 A1 Mar. 7, 2013

Related U.S. Application Data

(63) Continuation of application No. 12/689,940, filed on Jan. 19, 2010, now Pat. No. 8,291,563, which is a continuation of application No. 12/432,605, filed on Apr. 29, 2009, now Pat. No. 7,647,681.

(60) Provisional application No. 61/140,195, filed on Dec. 23, 2008.

(51) Int. Cl.
*B25B 27/14* (2006.01)

(52) U.S. Cl.
USPC .................. 29/281.1; 269/17; 269/8; 29/255

(58) Field of Classification Search
USPC ........... 29/281.1, 281.5, 281.3; 269/903, 909, 269/8, 17
See application file for complete search history.

(56) References Cited

U.S. PATENT DOCUMENTS

| | | | |
|---|---|---|---|
| 1,371,484 A | 3/1921 | Howard | |
| 2,289,458 A | 7/1942 | Rodgers | |
| 3,002,149 A | 9/1961 | Christian | |
| 3,491,995 A | 1/1970 | Taraba | |
| 4,263,553 A | 4/1981 | Cook et al. | |
| 4,300,754 A | 11/1981 | Lawrence | |
| 5,505,578 A | 4/1996 | Fuller | |
| 5,515,250 A | 5/1996 | Ortega | |
| 5,971,379 A | 10/1999 | Leon, Jr. | |
| 6,024,348 A | 2/2000 | Ventura et al. | |
| 6,029,407 A | 2/2000 | Schillero, Jr. | |
| 6,279,885 B1 | 8/2001 | Leon, Jr. | |
| 6,361,034 B1 | 3/2002 | Wolfe | |
| 6,707,360 B2 | 3/2004 | Underwood et al. | |
| 6,819,109 B2 | 11/2004 | Sowers et al. | |
| 7,012,495 B2 | 3/2006 | Underwood et al. | |
| 7,310,060 B2 | 12/2007 | Stilwell et al. | |
| 7,647,681 B1 * | 1/2010 | Harris et al. | 29/281.1 |
| 8,291,563 B2 * | 10/2012 | Harris et al. | 29/281.1 |
| 2004/0239460 A1 | 12/2004 | Kocijan | |
| 2010/0154194 A1 * | 6/2010 | Harris et al. | 29/464 |
| 2013/0058731 A1 * | 3/2013 | Harris et al. | 408/1 R |

* cited by examiner

*Primary Examiner* — Lee D Wilson
(74) *Attorney, Agent, or Firm* — Edmonds & Nolte, P.C.

(57) ABSTRACT

Apparatus and methods for positioning one or more components relative to a work surface are provided. The apparatus can include a frame having a first support member extending therefrom. At least one extendable member can be disposed on the first support member. The extendable member can be adapted to move in a linear direction. At least one magnet can be disposed on the frame. The magnet can include at least one contact side that can be switchable between a magnetized state and a non-magnetized state.

20 Claims, 6 Drawing Sheets

PORTABLE MAGNETIC POSITIONING TOOL

CROSS-REFERENCE TO RELATED APPLICATIONS

This application is a continuation of U.S. patent application Ser. No. 12/689,940, filed on Jan. 19, 2010, which is a continuation of U.S. patent application Ser. No. 12/432,605, filed on Apr. 29, 2009, which claims priority to U.S. Provisional patent application having Ser. No. 61/140,195, filed on Dec. 23, 2008, all of which are incorporated by reference herein.

BACKGROUND OF THE INVENTION

1. Field of the Invention

Embodiments of the present invention generally relate to apparatus and methods for metal working. More particularly, embodiments of the present invention relate to apparatus and methods for positioning two or more metal components.

2. Description of the Related Art

Metal fabrication, such as ship construction and storage tank construction, utilizes large sheets of metal that are welded together to form the overall structure. Reinforcement beams or stiffeners are typically welded to the structure for reinforcement.

However, properly positioning and aligning metal components, such as a beam and a sheet of metal, can be rather difficult and time consuming. Due to the size of the metal components, conventional clamps, pry bars, and other devices are impractical and/or difficult to use. Consequently, such conventional tools make the metal fabrication process time consuming and labor intensive.

There is a need, therefore, for a new apparatus and method for efficiently and effectively aligning two or more metal components for metal fabrication.

SUMMARY OF THE INVENTION

Apparatus and methods for positioning one or more components relative to a work surface are provided. In at least one specific embodiment, the apparatus can include a frame having a first support member extending therefrom. At least one extendable member can be disposed on the first support member. The extendable member can be adapted to move in a linear direction. At least one magnet can be disposed on the frame. The magnet can include at least one contact side that can be switchable between a magnetized state and a non-magnetized state.

In at least one other specific embodiment, the apparatus for positioning one or more components relative to a work surface can include a frame having a first side, a second side, and a support member disposed therebetween. A first magnet can be disposed on the first side and the first magnet can include a contact side that can be switchable between a magnetized state and a non-magnetized state. A second magnet can be disposed on the second side and the second magnet can include a contact surface that can be switchable between a magnetized state and a non-magnetized state. An extendable member can be disposed on the support member and the extendable member can be adapted to move in a linear direction toward the first magnet and the second magnet.

In at least one specific embodiment, the method for positioning one or more components relative to a work surface can include locating a component on a work surface. The work surface can be or include a magnetically susceptible material. A tool can be located about at least a portion of the component disposed on the work surface. The tool can include, but is not limited to, a frame having a support member extending therefrom, at least one extendable member disposed on the support member, and one or more magnets disposed on the frame. The at least one extendable member can be adapted to move in a linear direction. The one or more magnets can include at least one contact side that can be switchable between a magnetized state and a non-magnetized state. The method can further include securing the tool to the work surface by switching at least one of the one or more magnets from the non-magnetized state to the magnetized state and contacting the component with the extendable member.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
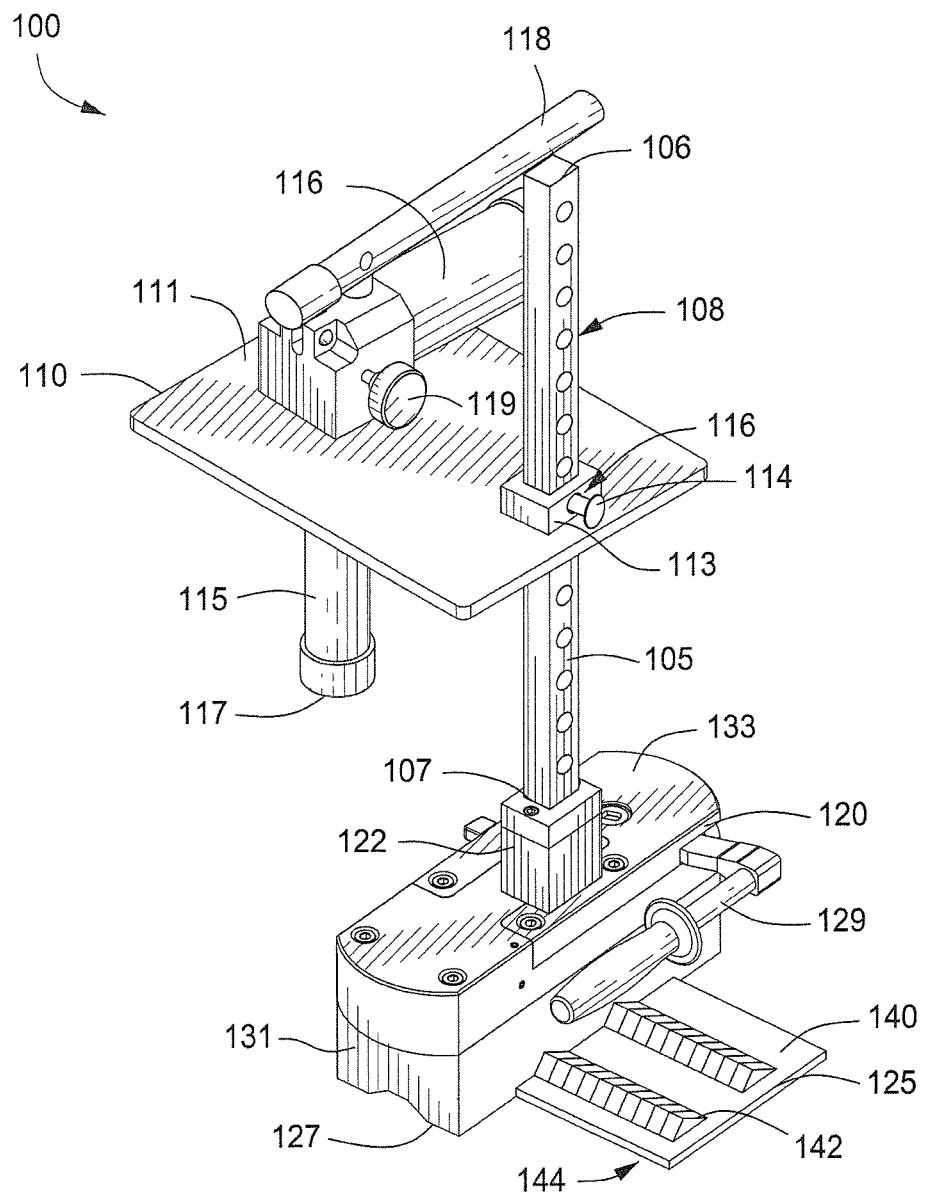
FIG. 1 depicts a perspective view of an illustrative portable, magnetic positioning tool, according to one or more embodiments described.

FIG. 1 depicts a perspective view of an illustrative portable, magnetic positioning tool, according to one or more embodiments. The portable positioning tool ("tool") 100 can include a frame 105, a first support member 110, at least one extendable member (one is shown 115), and at least one switchable magnet (one is shown 120). The first support member 110 and the switchable magnet 120 can be disposed on or about the frame 105. The first support member 110 can be disposed between a first end 106 and a second end 107 of the frame 105 and the switchable magnet 120 can be disposed on or about the second end 107 of the frame 105. The extendable member 115 can be disposed on and extend from the first support member 110 toward the switchable magnet 120.

In one or more embodiments, the frame 105 can be or include an elongated, rigid member, such as a rod, bar, beam, or the like. The frame 105 can be solid, hollow, or a combination thereof. The frame 105 can connect or otherwise position the first support member 110 relative to the switchable magnet 120. The frame 105 can hold or otherwise maintain a predetermined distance and/or orientation between the first support member 110 and the switchable magnet 120.

In one or more embodiments, the extendable member 115 can include a body 116 that can be disposed on or about a first side 111 of the first support member 110 from which the extendable member 115 can extend. The first side 111 of the first support member 110 can be oriented toward the first end 106 of the frame 105 and the extendable member 115 can extend from the body 116, through the first support member 110, and toward the switchable magnet 120 disposed on or about the second end 107 of the frame 105. In one or more embodiments, the body 116 can be connected or otherwise secured directly to the frame 105, thereby replacing the first support member 110 with the body 116.

In one or more embodiments, the extendable member 115 can be adapted to move in a linear direction. In one or more embodiments, the extendable member 115 can be parallel to the longitudinal axis of the frame 105. The extendable member 115 can include a contact surface 117. When the extendable member 115 extends toward the switchable magnet 120, the contact surface 117 can contact or otherwise engage with an object (not shown) disposed on a work surface (not shown) upon which the tool 100 can be located. The contact surface 117 can be substantially parallel to the contact side 127 of the magnet 120. A force exerted by the extendable member 115 can be sufficient to hold or otherwise reduce movement of the object, for example.

The extendable member 115 can include any system, device, or combination of systems and/or devices suitable for linearly extending from the first support member 110 toward the second end 107 of the frame 105. As illustrated, the extendable member 115 can be a hydraulically actuated ram or piston. The body 116 can include a handle or lever 118 that when actuated can linearly advance the extendable member 115. The body 116 can include a valve 119 that when actuated can retract the extendable member 115.

Other illustrative extendable members 115 can include, but are not limited to, a pneumatically actuated ram or piston, a threaded rod disposed through a complimentary threaded hole disposed in the first support member 110, and an electrically actuated ram or piston. The threaded rod can be linearly advanced and/or retracted through manual rotation or rotation using a motor, for example a battery powered motor.

In one or more embodiments, the first support member 110 can include a collar 113 disposed thereon, which can include a one or more holes 116 disposed therethrough. One or more holes 108 can be disposed through the frame 105. When holes 108 and 116 are properly aligned, a fastener 114 can be disposed therethrough to detachably attach or secure the first support member 110 about the frame 105. The fastener 114 can be, but is not limited to, a pin, bolt, screw, rod, or other device that can secure the first support member 110 at a desired position about the frame 105. Two or more holes 108 linearly spaced about the frame 105 can provide a first support member 110 that can be linearly adjusted about the frame 105 at two or more locations between the first end 106 and the second end 107 of the frame 105.

In one or more embodiments, a first side or connecting side 133 of the switchable magnet 120 can be connected to the second end 107 frame 105. The first side 133 can oppose a second side 127 of the switchable magnet 120. As illustrated; a connection member or connection block 122 can be disposed intermediate the first side 133 and the second end 107 of the frame 105. The switchable magnet 120 can be connected to the frame 105 using any suitable fastening device, system, and/or method. Illustrative fasteners can include, but are not limited to, one or more bolts, screws, threaded rods, bolts and nuts, pins, rivets, and the like. In one or more embodiments, the switchable magnet 120 via the first side 133 can be connected to the frame 105 by welding.

In one or more embodiments, the switchable magnet 120 can be switchable between a magnetized state ("on") and a non-magnetized state ("off"). The switchable magnet 120 can be switched between the "on" position and the "off" position via a switch or lever 129. In one or more embodiments, the switchable magnet 120 can be any magnet capable of being switched between an "on" position and an "off" position. In one or more embodiments, the switchable magnet 120 can be an electromagnet. In one or more embodiments, the switchable magnet 120 can be or include one or more permanent magnets. In one or more embodiments, the switchable magnet 120 can include a housing 131 which can at least partially house or enclose the switchable magnet disposed therein.

In one or more embodiments, the housing 131 can be or include one or more materials having a low magnetic reluctance or a high magnetic reluctance. The low magnetic reluctance materials can be ferrimagnetic or ferromagnetic ("magnetically susceptible material"). The high magnetic reluctance materials can include, for example aluminum, magnesium, and/or carbon fiber. In one or more embodiments, within the housing 131, a first magnet or "lower magnet" can be held in a fixed position beneath a second magnet or "upper magnet" that can be rotated about its axis. In one or more embodiments, the lower surface of the lower magnet can form part of the lower surface or "contact side" 127 of the switchable magnet 120. In one or more embodiments, the lower surface of the lower magnet can be recessed within the housing 131, such that the sides of the housing 131 provide a gap between a lower surface of the lower magnet and the contact surface 127 of the switchable magnet 120.

The switch or lever 129 can rotate the second magnet relative to the first magnet within the housing 131. The second magnet can include a notch or groove adapted to engage or receive a bar (not shown) in communication with the lever 129. The bar can be received inside a groove formed on a boss (not shown) that is connected to the lever 129. The lever 129 can have two or more positions, at least one of which is an "on" position and at least one of which is an "off" position.

In one or more embodiments, rotating the second magnet 180° about its axis can align the poles of both the first magnet and the second magnet in the "on" position to produce an external magnetic field. When so aligned, the north (positive) and south (negative) poles of the second magnet can substantially overlie the north and south poles of the first magnet, creating a strong external magnetic field about the housing 131. In one or more embodiments, at least a portion of the strong external magnetic field can be directed toward the contact side 127 of the magnet 120. The contact side 127 can provide a surface along the switchable magnet 120 that can, when switched to the "on" position, magnetically attach to a magnetically susceptible surface (not shown).

In one or more embodiments, the housing 131 can be or include one or more pole pieces that can enhance the magnetic functionality of the switchable magnet 120. The shape or wall thickness of the pole pieces forming the housing 131 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the switchable magnet 120 can include one, two, three, four, five, or more independent switchable magnets. In one or more embodiments, a switchable magnet 120 that includes a plurality of switchable magnets disposed within the housing 131 can be switched between the "on" and "off" positions via a single lever 129. In one or more embodiments, a switchable magnet 120 that includes a plurality of switchable magnets disposed within the housing 131 can include two or more levers 129 that can switch one or more of the switchable magnets between the "on" position and the "off" position.

In one or more embodiments, the housing 131 can provide a waterproof and/or dustproof housing to protect the one or more switchable magnets disposed therein. This can provide a switchable magnet 120 suitable for use in harsh, dusty, and/or wet environments. Additional details of a suitable switchable magnet 120 is further discussed and described in U.S. Pat. Nos. 6,707,360 and 7,012,495 and U.S. Patent Application Publication No.: 2004/0239460.

In one or more embodiments, the tool 100 can further include a second support member 125 connected to or otherwise disposed on or about the switchable magnet 120, the frame 105, or both. The second support member 125 can extend laterally from the switchable magnet 120 and/or the frame 105 to provide support for the tool 100. The second support member 125 can extend from the switchable magnet 120 and/or the frame 105 in a direction opposite the first support member 110, which can provide support that can counter balance or counter at least a portion of a force exerted on the tool 100 when the extendable member 115 extends and engages an object disposed on a work surface and/or the work surface (not shown) upon which the tool 100 is located.

The second support member 125 can be or include any suitable support stricture, such as a rod, beam, plate, bar, or the like. In one or more embodiments, a first side 140 of the second support member 125 can include one or more gussets or reinforcement members 142 disposed thereon. The gussets 142 can stiffen and reinforce the second support member 125. The gussets 142 can reduce and/or prevent movement of the second support member 125 relative to the switchable magnet 120.

In one or more embodiments, the second support member 125 can include a second side 144 that can oppose the first side 140. The second side 144 can contact a work surface on which the tool 100 can be located. In one or more embodiments, the second side 144 of the second support member 125 can be planar with the contact side 127 of the switchable magnet 120. In one or more embodiments, the second support member 125 can include one or more contact points that can be planar with the contact side 127 of the switchable magnet 120.

The second support member 125 can extend from the switchable magnet 120 and/or the frame 105 any suitable distance. In at least one specific embodiment, the second support member 125 can extend from the frame 105 a distance equal to or greater than the distance the longitudinal center axis of the extendable member 115 extends from the frame 105. As the distance the second support member 125 extends from the switchable magnet 120 and/or the frame 105 increases, the second support member 125 can provide a greater counter balance to a force that can be exerted from the extendable member 115 to the tool 100 when the extendable member 115 extends and engages an object and/or a work surface, In operation, the tool 100 can be disposed on a magnetically susceptible work surface (not shown), so that the contact side 127 of the switchable magnet 120 can be disposed on or proximate to the work surface. The switchable magnet 120 can be switched from the "off" position to the "on" position via the lever 129, thereby securing the tool 100 to the work surface. An object (not shown) to be secured between and/or to the work surface and the contact surface 117 of the extendable member 115 can be placed in position and the extendable member 115 can be linearly advanced toward the object by actuating the handle 118. The extendable member 115 can be linearly advanced, such that the contact surface 117 of the extendable member 115 contacts the object disposed on the work surface. The extendable member 115 can apply sufficient force toward the object to securely hold or press the object on the work surface. The switchable magnet 120 can remain in contact with the work surface while the extendable member exerts the force or weight toward the object and/or the work surface. To retract the extendable member, the valve 119 can be actuated. In one or more embodiments, the extendable member 115 can exert a force or weight toward the object and/or the work surface of about 20 kg or more, about 50 kg or more, about 500 kg or more, about 1,000 kg or more, about 1,500 kg or more, about 1,800 kg or more, about 2,000 kg or more, about 2,500 kg or more, or about 2,700 kg or more.

As discussed above, the position of the first support member 110 can be adjustable about the length of the frame 105. Adjusting the position of the first support member 110 can vary the distance between the contact surface 117 of the extendable member 115 and the contact side 127 of the switchable magnet 120. Linearly advancing and/or retracting the extendable member 115 can also vary the distance between the contact surface 117 of the extendable member 115 and the contact side 127 of the switchable magnet 120. Adjusting the position of the first support member 110 and the extent to which the extendable member 115 can be extended or retracted, can provide a tool 100 capable of positioning, holding, retaining, or otherwise securing objects (not shown) of various sizes between a work surface and the contact surface 117.

Figure 2:
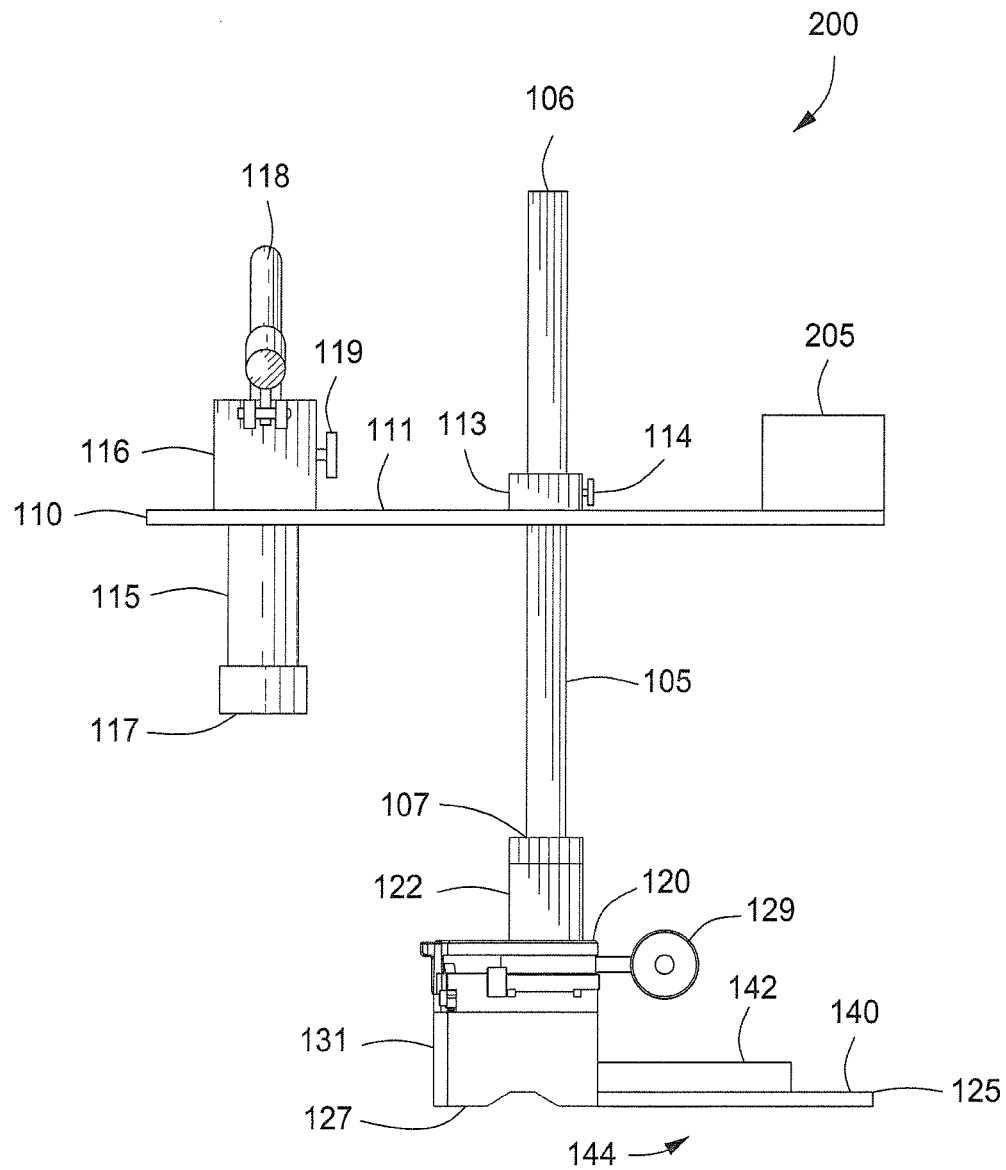
FIG. 2 depicts a side perspective view of another illustrative portable, magnetic positioning tool, according to one or more embodiments described.

FIG. 2 depicts a side perspective view of another illustrative portable, magnetic positioning tool 200, according to one or more embodiments. In one or more embodiments, the portable magnetic positioning tool ("tool") 200 can be similar to the tool 100 discussed and described above with reference to FIG. 1. The tool 200 can further include one or more counterweights 205. The counterweight 205 can counterbalance at least a portion of the weight of the first support member 110, the extendable member 115, and/or the body 116 of the extendable member 115. In one or more embodiments, the counterweight 205 can be disposed on the opposing side of the frame 105 as the extendable member 115. As illustrated, counterweight 205 can be disposed on a portion of the first support member 110 that extends away from the frame 105 opposite the side the extendable member 115 is disposed. As such, the counterweight 205 can provide a stable tool 200. For example, the tendency for the tool 200 to lean or fall over due to the weight of the extendable member 115, the body 116 of the extendable member 115, and/or the first support member 110 can be reduced or eliminated.

In one or more embodiments, the counterweight 205 can be any material that adds a sufficient weight to the tool 200. In one or more embodiments, the counterweight can be metal, concrete, a liquid filled container, and the like. In one or more embodiments, the counterweight 205 can include a battery, which can power an electrically actuated extendable member 115. In one or more embodiments, the counterweight 205 can be configured to include a plurality of weighted members, which can be removed to or from the counterweight 205, thereby varying the weight of the counterweight 205. In one or more embodiments, the second support member 125 can be of sufficient weight that the second support member 125 can function as the counterweight 205, thereby eliminating the need for the counterweight 205.

Figure 3:
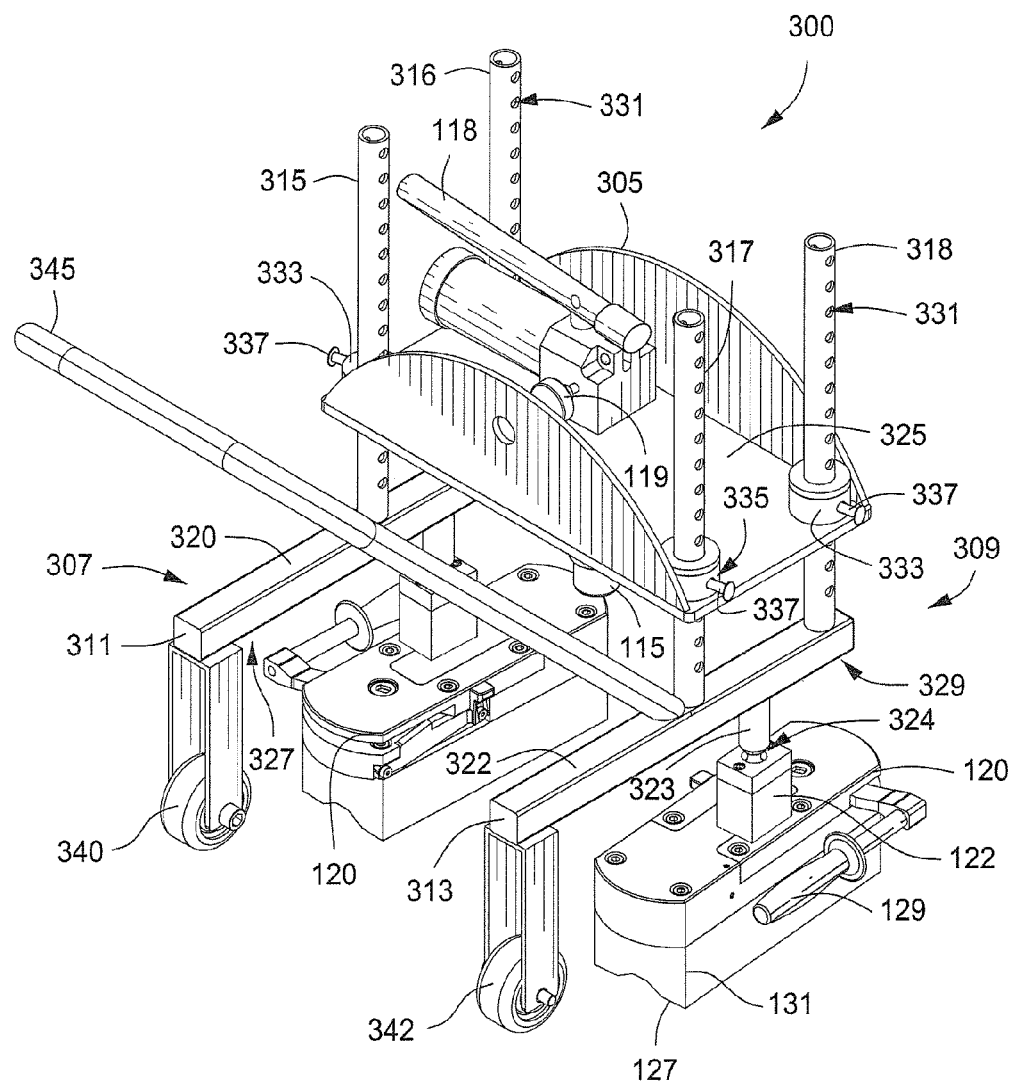
FIG. 3 depicts a perspective view of another illustrative portable, magnetic positioning tool, according to one or more embodiments described.
Figure 4:
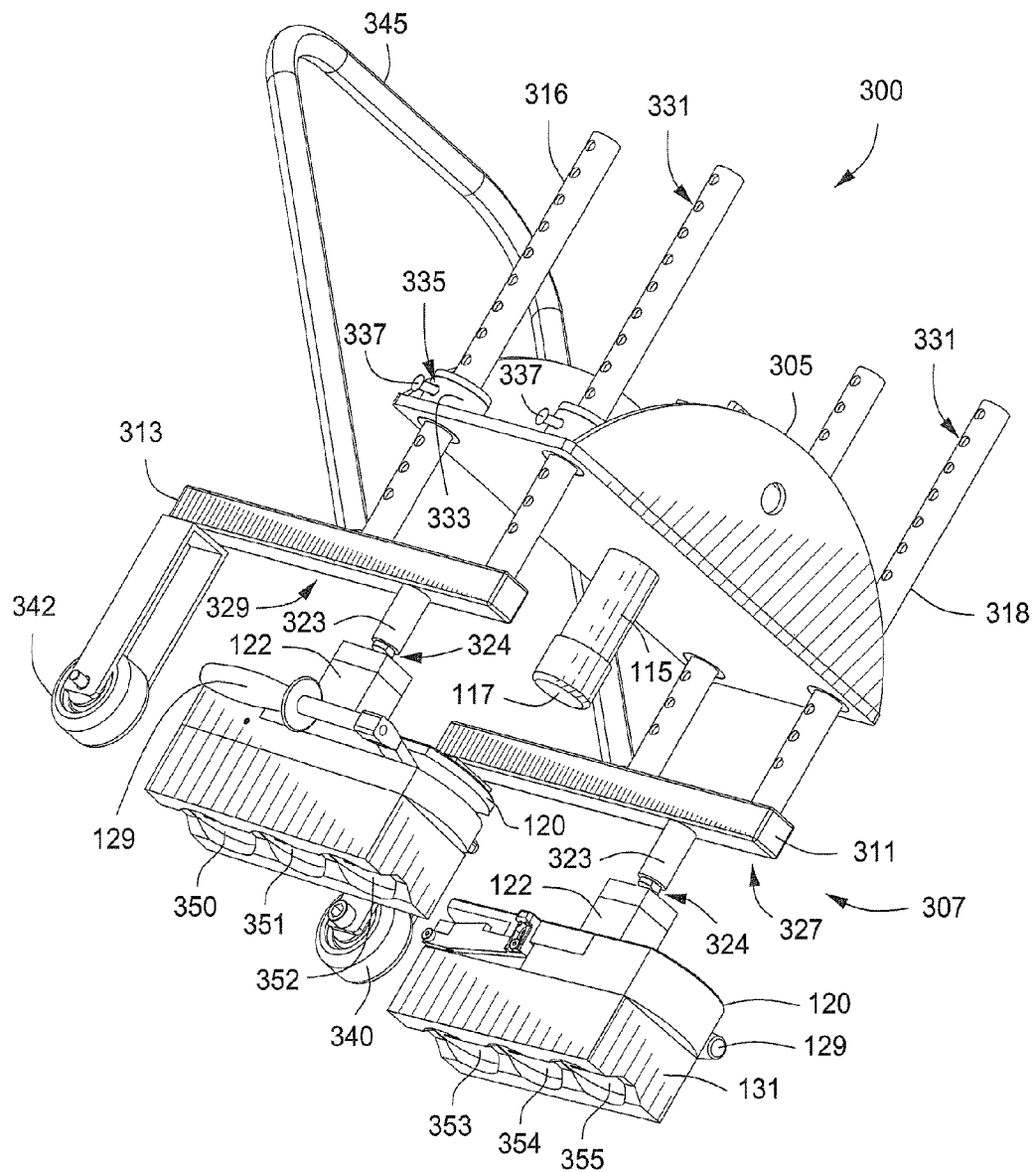
FIG. 4 depicts another perspective view of the illustrative portable, magnetic positioning tool depicted in FIG. 3.

FIGS. 3 and 4 depict a perspective view of another illustrative portable, magnetic positioning tool 300, according to one or more embodiments. Referring to FIGS. 3 and 4, the portable, magnetic positioning tool ("tool") 300 can include a frame 305 having a first side 307, a second side 309, and a support member 325 disposed therebetween. The first side 307 can be or include a first elongated member 311 and the second side 309 can be or include a second elongated member 313. The first elongated member 311 and the second elongated member 313 can be parallel to one another. The first elongated member 311 and the second elongated member 313 can be planar to one another. The first elongated member 311 and the second elongated member 313 can be or include a rod, bar, beam, or the like. The first elongated member 311 and/or the second elongated member 313 can be solid, hollow, or a combination thereof.

One or more extensions or protrusions (two are shown 315, 316) can extend outwardly from a first surface 320 of the first elongated member 311. One or more extensions or protrusions (two are shown 317, 318) can extend outwardly from a first surface 322 of the second elongated member 313. The extensions 315, 316, 317, and 318 can be or include a rod, bar, beam, or the like. The extensions 315, 316, 317, and 318 can be solid, hollow, or a combination thereof.

The extensions 315 and/or 316 can be perpendicular to the first surface 320 of the first elongated member 311 and the extension 317 and/or 318 can be perpendicular to the first surface 322 of the second elongated member 313. The two extensions 315, 316 disposed on the first elongated member 311 can be aligned with the two extensions 317, 318 disposed on the second elongated member 313. For example, the extension 315 can be aligned with the extension 317 and the extension 316 can be aligned with the extension 318. In one or more embodiments, the first elongated member 311 and/or the second elongated member 313 can include no extension, one extension, or three or more extensions. In one or more embodiments, the first elongated member 311 and the second elongated member 313 can include the same number of extensions or a different number of extensions.

The extensions 315, 316, 317, and/or 318 can support the support member 325. The extensions 315, 316, 317, and/or 318 can adjustably support the support member 325. The support member 325 can be parallel to the longitudinal axes of the first elongated member 311 and the second elongated member 313. As illustrated, the support member 325 includes four holes through which the extension members 315, 316, 317, and 318 can be disposed. The support member 325 can include one or more collars (four are shown 333) adapted to detachably connect the support member 325 to the extensions 315, 316, 317, and 318.

The extension members 315, 316, 317, and 318 can include one or more holes 331 disposed therethrough and the collars 333 can include one or more holes 335 disposed therethrough. The one or more holes 331, 335 can receive a fastener 337, which can detachably attach and secure the support member 325 about the extension members 315, 316, 317, and 318. In at least one specific embodiment, the support member 325 can be connected, either permanently or detachably, to the first elongated member 311 and the second elongated member 313, thereby deleting the extension members 315, 316, 317, and 318.

The fastener 337 can include any device suitable for securing the support member 325 about the extensions 315, 316, 317, and 318, either permanently or detachably. Illustrative fasteners can include, but are not limited to, screws, pins, bolts and nuts, rivets, rods, and the like. In one or more embodiments, the support member 325 can be permanently secured or connected about the extensions 315, 316, 317, 318 by welding, for example.

One or more switchable magnets 120 can be connected to a second surface 327 of the first elongated member 311 and one or more switchable magnets 120 can be connected to a second surface 329 of the second elongated member 313. The switchable magnets 120 can include a contact surface 127. The contact surfaces 127 of the switchable magnets 120 can be parallel. The contact surfaces 127 of the switchable magnets 120 can be planar.

In one or more embodiments, a first switchable magnet 120 can be connected to and extend from the second surface 327 of the first elongated member 311 via a connection block 122 and a extension member 323 and a second switchable magnet 120 can be connected to and extend from the second surface 329 of the second elongated member 313 via a connection block 122 and an extension member 323. In one or more embodiments, the connection block 122 and the extension member 323 can include a rotatable, swivelable, and/or pivotable connection 324. The connection 324 can allow the switchable magnets 120 to at least partially rotate, swivel, pivot, and/or any other type of movement relative to the frame 325. For example, the connection 324 can be a ball and socket connection.

One or more extendable members 115 can be disposed on the support member 325. The extendable member 115 can be extended from the support member 325 toward the first elongated member 311 and the second elongated member 313. The extendable member 115 can be adapted to linearly extend from the support member 325 toward the first elongated member 311 and the second elongated member 313. The extendable member 115 can include a contact surface 117 that can contact a work surface or an object disposed on the work surface (not shown) located between the first switchable magnet 120 and the second switchable magnet 120.

Referring to FIG. 4, the first switchable magnet 120 extending from the first elongated member 311 and the second switchable magnet 120 extending from the second elongated member 313 can each include three switchable magnets. The first switchable magnet 120 includes a first switchable magnet 350, a second switchable magnet 351, and a third switchable magnet 352. The second switchable magnet 120 can include a first switchable magnet 353, a second switchable magnet 354 and a third switchable magnet 355. Any number of switchable magnets can be disposed within the housing 131 of the first switchable magnet 120 and the second switchable magnet 120.

Referring again to FIGS. 3 and 4, the frame 305 can further include one or more wheels (two are shown 340, 342) extending therefrom. The frame 305 can include a first wheel 340 and a second wheel 342 extending from the first elongated member 311 and the second elongated member 313, respectively. A handle 345 can extend from the frame 305, which can be used to move the tool 300 about a work surface (not shown). The handle 345 can be connected to the first side 320 of the first elongated member 311 and to the first side 322 of the second elongated member 313. In one or more embodiments, an operator, for example, a person can push downward on the handle 345 to place the first wheel 340 and the second wheel 342 in contact with the work surface. With the first and second wheels 340, 342 in contact with the work surface the switchable magnets 120 can be located above the work surface by applying a sufficient downward force on the handle 345. With the switchable magnets 120 above the work surface the tool 300 can be directed about the work surface on the first and second wheels 340, 342.

Figure 5:
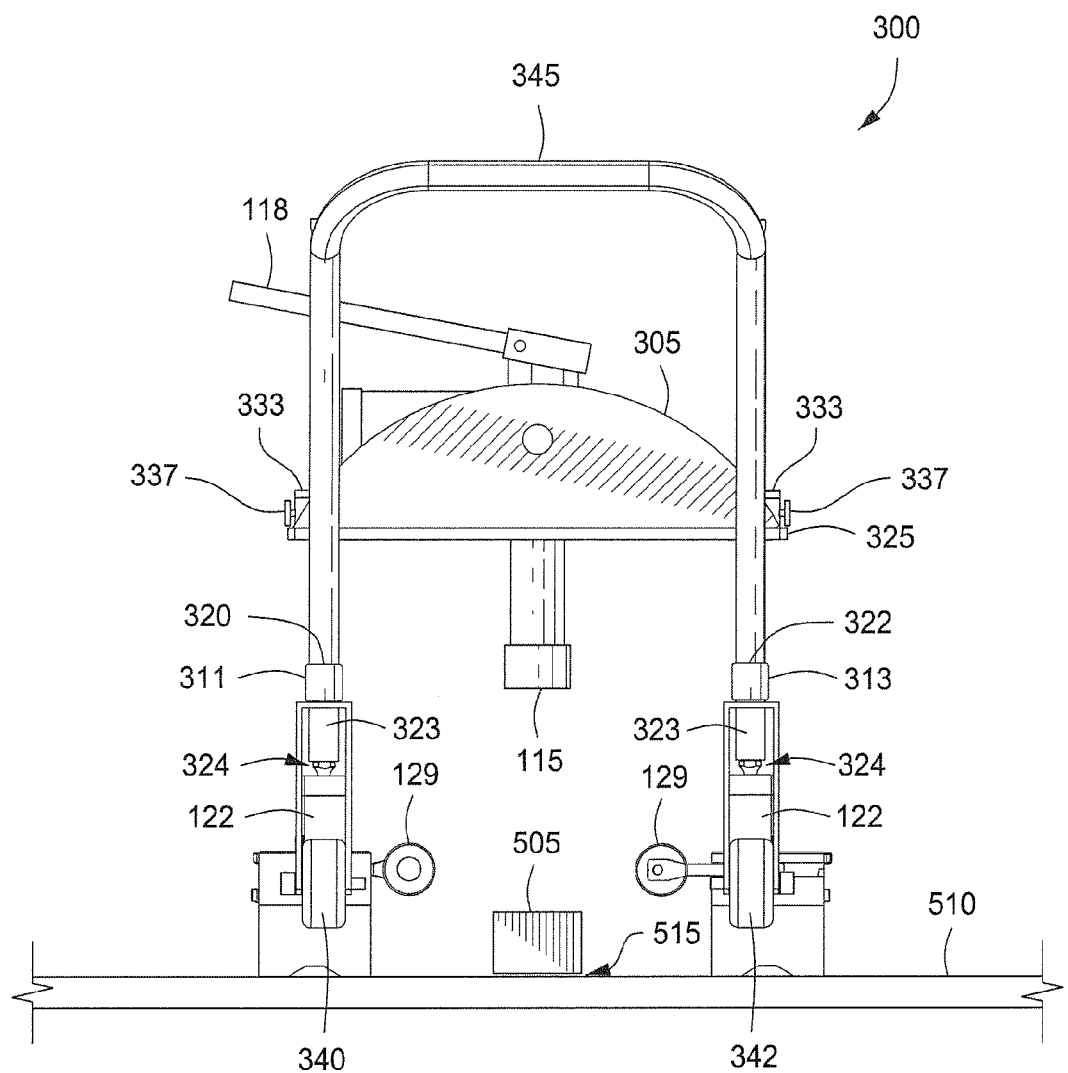
FIG. 5 depicts a perspective end view of the illustrative portable, magnetic positioning tool shown in FIGS. 3 and 4 positioned to align an object on a magnetically susceptible member, according to one or more embodiments described.

FIG. 5 depicts a perspective end view of the tool positioned to align an object 505 on a magnetically susceptible member "work surface" 510, according to one or more embodiments. In operation, the tool 300 can be located onto the work surface 510 and at least one of the switchable magnets 120 can be turned from the "off" position to the "on" position. An object 505 can be located on the work surface 510 either before or after the tool 300 is located on the work surface 510.

The extendable member 115 can be extended toward the work surface 510, such that the contact surface 117 of the extendable member 115 contacts the object 505. The extendable member 115 can exert a sufficient force toward the object, such that at least a portion of a gap 515 (if a gap is present) between the object 505 and the work surface 510 can be reduced or eliminated. The gap 505 can be due to the object 505 and/or the work surface 510 having non-planar surfaces. For example, the object 505 and/or the work surface 510 can be warped or bent. At least a portion of the gap 515 can be reduced by pushing the object 505 toward the work surface 510, by pulling the work surface 510 toward the object 505, or both. In one or more embodiments, the gap 515 can be completely eliminated, thereby providing direct contact between the object 505 and the work surface 510.

The work surface 510 can be any suitable magnetically susceptible material, which can include, but is not limited to, iron, steel, other ferrous metals, ferrous alloys, and combinations thereof. The magnetically susceptible material can be a composite material having both magnetically susceptible and non-magnetically susceptible components. In at least one specific embodiment a non-magnetically susceptible work surface can be disposed on the magnetically susceptible work surface 510. The non-magnetically susceptible work surface can be thin enough to allow at least one of the switchable magnets 120, when in the "on" position to magnetically attach to the magnetically susceptible work surface 510. The object 505 and the work surface 510 can be made from the same material or different materials. The object 505 can be metal, non-metal, or a combination thereof. The object 505 and/or a non-magnetically susceptible work surface disposed on the magnetically susceptible work surface 510 can be fiberglass, wood, polymeric materials, carbon fiber, and the like.

Figure 6:
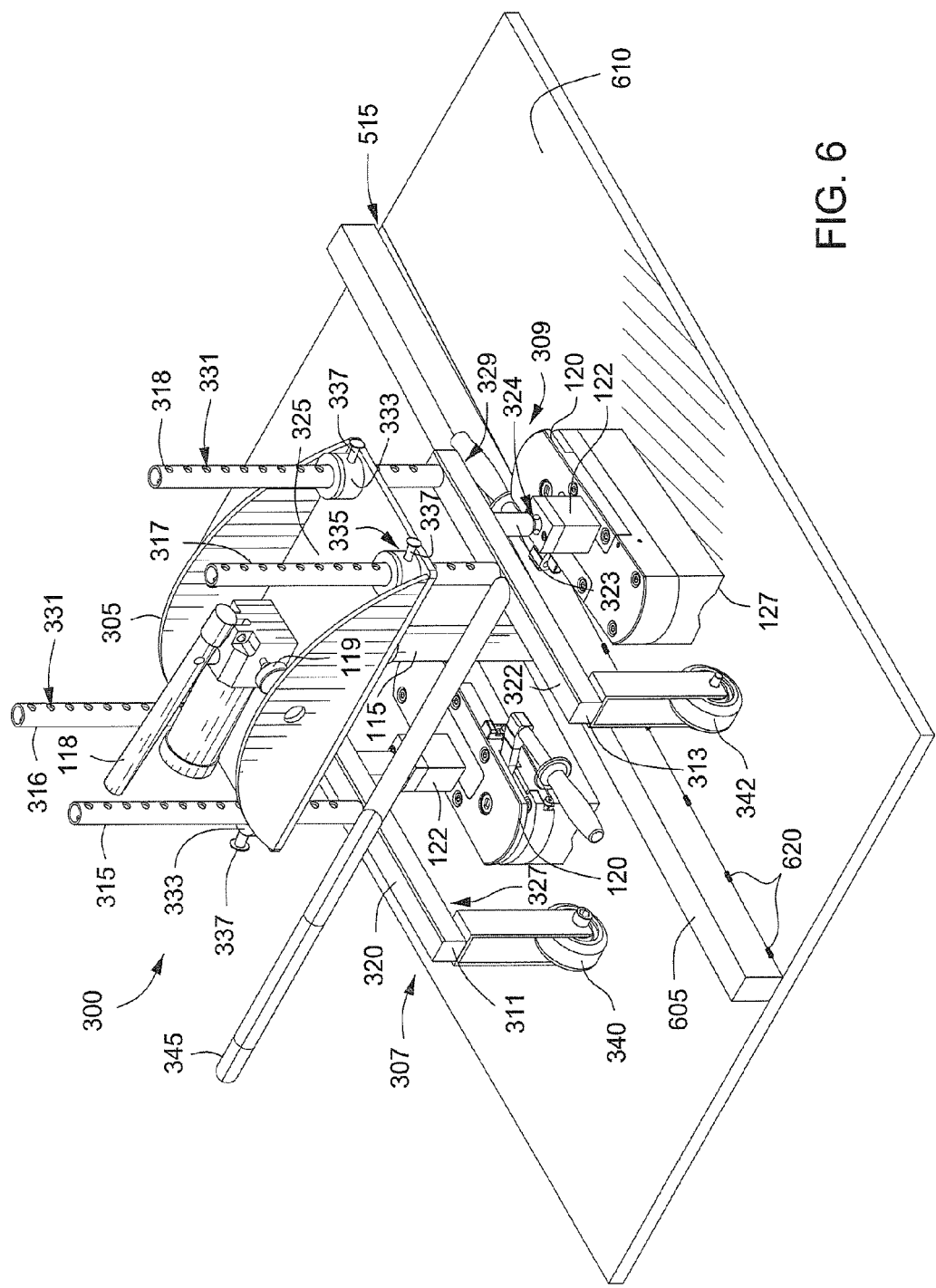
FIG. 6 depicts a perspective view of the illustrative portable, magnetic positioning tool shown in FIGS. 3-5 engaged in aligning a reinforcement beam with a metal plate, according to one or more embodiments described.

FIG. 6 depicts a perspective view of the tool 300 engaged in aligning a reinforcement beam 605 with a metal plate 610 according to one or more embodiments. The reinforcement beam 605 can be welded to the metal plate 610 to provide additional structural rigidity and support to the metal plate 610. A plurality of reinforced plates can be combined or joined together to provide a ship hull, storage tank, wall, or other structure having one or more reinforcement beams 605 welded thereto for additional strength and support.

In one or more embodiments, the metal plate 610 and the reinforcement beam 605 can be the same material or different materials. For example, the metal plate 610 can be a magnetically susceptible material, for example steel and the reinforcement beam 605 can be a non-magnetically susceptible material, for example stainless steel. In one or more embodiments, the magnetically susceptible material can be a composite material having both magnetically susceptible and non-magnetically susceptible components.

In operation, the reinforcement beam 605 can be located onto the metal plate 610 and the tool 300 can be located onto the metal plate 610 about the reinforcement beam 605 and at least one of the switchable magnets 120 can be turned from the "off" position to the "on" position, thereby temporarily securing the tool 300 to the metal plate 610. The extendable member 115 via actuation of the handle 118 can be advanced toward and placed in contact with the reinforcement beam 605. The extendable member 115 can apply a sufficient force toward the reinforcement beam 605, such that at least a portion of a gap 515 (if a gap is present) between the reinforcement beam 605 and the metal plate 610 can be reduced. The gap 515 can be due to the reinforcement beam 605 and/or the metal plate 610 being warped or bent, for example. At least a portion of the gap 515 can be reduced by pushing the reinforcement beam 605 toward the metal plate 610, by pulling the metal plate 610 toward the reinforcement beam 605, or both. In one or more embodiments, the gap 515 can be completely eliminated, thereby providing direct contact between the reinforcement beam 605 and the metal plate 610.

With the gap 515 completely eliminated or at least reduced a sufficient amount to position the reinforcement beam 605 and the metal plate 610 proximate each other, one or more welds 620 can be made. The weld 620 can be a spot weld or the weld 620 can be about a portion of the length of the interface between the reinforcement beam 605 and the metal plate 610, i.e. a weld seam. After the weld 620 is formed and the reinforcement beam 605 and the metal plate 610 have been locally jointed together, the extendable member 115 can be retracted via actuation of the valve 119 and the switchable magnets 120 can then be switched from the "on" position to the "off" position, thereby releasing the tool 300 from the metal plate 610. The tool 300 can then be advanced along the metal plate 610 to another location a weld 620 is desired and the operation can be repeated. The reinforcement beam 605 can quickly be spot welded or welded about its length to the metal plate 610 in this manner to provide a joined reinforcement beam 605 and metal plate 610.

In one or more embodiments, the weld 620 can be formed using any suitable welding method or welding methods. For example, the weld 620 can be formed using one or more welding heads (not shown) that can include, but are not limited to, gas tungsten arc welding ("GTAW"), gas metal arc welding ("GMAW"), pulsed gas metal arc welding ("GMAW-P"), flux core arc welding ("FCAW"), shielded metal arc welding ("SMAW"), pulsed flux core arc welding ("FCAW-P"), plasma arc welding ("PAW"), submerged arc welding ("SAW"), laser welding, Oxy-Acetylene welding, resistance welding, ultrasound welding, atomic hydrogen welding, carbon arc welding, electroslag welding, electrogas welding, stud arc welding, or any combination thereof. In one or more embodiments, the welding head can be operated by a person or an automated machine. In at least one specific embodiment, the welding head can be disposed on the tool 300, which can be manually or automatically controlled to form the welds 620.

Referring to FIGS. 1-6, the tools 100, 200, and/or 300 can be used to perform other work or other kinds of work upon a work surface in addition to or in lieu of the force exerted by the extendable member 115. For example, the tool 300 can be used to drive or push via the extendable member 115 a tightly fitted pin, rod, rivet, or the like into a hole disposed in the work surface 510. Likewise, the tool 300 can be used to drive, push, or otherwise remove a compression fitted pin, rod, rivet, or the like disposed in a hole in the work surface 510. In one or more embodiments, the tool 300 can be used as a clamping device that secures an object 505 between the extendable member 115 and the work surface 510. As such, the object 505 can be any object desired to be temporarily secured between the extendable member 115 and the work surface 510. For example, the object 505 can be a piece of lumber or board, which requires temporarily securing the lumber for cutting, drilling, or other action to be performed on the lumber.

In one or more embodiments, the extendable member 115 can be a drill bit or can include a drill bit attachment. The drill bit can drill, bore, mill, or otherwise form one or more holes into a magnetically susceptible work surface, an object disposed on a magnetically susceptible work surface, or both. The extendable drill bit can be rotated by an electric motor, for example.

In one or more embodiments, the contact surface 117 of the extendable member 115 can include a die or stamp. The die or stamp can be used to cut shaped pieces of material out of a substrate by linearly pressing the die or stamp into the substrate. In yet another embodiment, the extendable member 115 can be a pneumatically or hydraulically actuated bit. A pneumatically or hydraulically actuated bit can include, for example, a chisel, a cutter, a punch, or a hammer configuration that when actuated can perform work on a magnetically susceptible work surface, an object disposed on a magnetically susceptible work surface, or both.

Any one or more components described, such as the frames 105, 305, the support members 110, 125, and 325, for example, can be made from one or more metallic materials, non-metallic materials, or composite material. Illustrative metallic materials can include, but are not limited to, non-ferrous metals, ferrous metals, alloys thereof, or any combination thereof. Illustrative non-metallic materials can include, but are not limited to, engineered plastics, fiberglass, fiber reinforced plastics (FRP), carbon fiber, polymeric materials, wood, or combinations thereof.

In another embodiment, an apparatus for positioning one or more components relative to a work surface, comprises: a frame having a first support member extending therefrom; at least one extendable member disposed on the first support member, wherein the extendable member is adapted to move in a linear direction; and at least one magnet disposed on the frame, wherein the magnet has at least one contact side that is switchable between a magnetized state and a non-magnetized state.

In another embodiment, the apparatus in the preceding paragraph 0063 further comprises a second support member that extends from the magnet, wherein a side of the second support member includes a contact point that is planar with the contact side of the switchable magnet.

Another embodiment can be the apparatus in any of the preceding paragraphs 0063-0064, wherein the second support member extends in an opposing direction from the frame as the first support member.

Another embodiment can be the apparatus in any of the preceding paragraphs 0063-0065, wherein the second support member includes one or more gussets for reinforcing the second support member.

Another embodiment can be the apparatus in any of the preceding paragraphs 0063-0066, wherein the first support member is parallel to the contact side, and wherein the first support member is linearly adjustable relative to the contact side.

Another embodiment can be the apparatus in any of the preceding paragraphs 0063-0067, wherein the magnet comprises a housing, at least two permanent magnets and a lever for causing relative rotation of the permanent magnets.

Another embodiment can be the apparatus in any of the preceding paragraphs 0063-0068, wherein a contact surface of the extendable member is substantially parallel to the contact side of the magnet.

In another embodiment, the apparatus in any of the preceding paragraphs 0063-0069 further comprises one or more counterweights disposed about the frame to provide a counterbalance to the extendable member, the first support member, or both.

Another embodiment can be the apparatus in any of the preceding paragraphs 0063-0070, wherein the extendable member comprises a threaded member disposed through a complimentary threaded hole in the first support member, a hydraulically actuated member, or a pneumatically actuated member.

In another embodiment, the apparatus in any of the preceding paragraphs 0063-0071 further comprises a rotatable connection disposed between the magnet and the frame, wherein the rotatable connection permits at least partial rotation of the magnet relative to the frame.

In another embodiment, an apparatus for positioning one or more components relative to a work surface, comprises a frame having a first side, a second side, and a support member disposed therebetween; a first magnet disposed on the first side, wherein the first magnet includes a contact side that is switchable between a magnetized state and a non-magnetized state; a second magnet disposed on the second side, wherein the second magnet includes a contact surface that is switchable between a magnetized state and a non-magnetized state; and an extendable member disposed on the support member, wherein the extendable member is adapted to move in a linear direction toward the first magnet and the second magnet.

Another embodiment can be the apparatus in the preceding paragraph 0073 wherein the first side comprises a first elongated member, wherein one or more extensions are disposed on a first side of the first elongated member and the first magnet is disposed on a second side of the first elongated member; wherein the second side comprises a second elongated member, wherein one or more extensions are disposed on a first side of the second elongated member and the second magnet is disposed on a second side of the second elongated member; and wherein the support member is disposed about the one or more extensions disposed on the first elongated member and the second elongated member.

Another embodiment can be the apparatus in any of the preceding paragraphs 0073-0074, wherein the support member is linearly adjustable about the first side and the second side.

Another embodiment can be the apparatus in any of the preceding paragraphs 0073-0075, wherein the extendable member comprises a threaded member disposed through a complimentary threaded hole in the support member, a hydraulically actuated member, or a pneumatically actuated member.

In another embodiment, the apparatus in any of the preceding paragraphs 0073-0076 further comprises at least one wheel disposed on the first side of the frame and at least one wheel disposed on the second side of the frame, and at least one handle disposed on the frame.

In another embodiment, the apparatus in any of the preceding paragraphs 0073-0077, further comprises a first rotatable connection disposed between the first magnet and the first side and a second rotatable connection disposed between the second magnet and the second side, wherein the first and second rotatable connections permit at least partial rotation of the first and second magnets relative to the frame.

In another embodiment a method for positioning one or more components relative to a work surface, comprises: locating a component on a work surface, wherein the work surface comprises a magnetically susceptible material; locating a tool about at least a portion of the component disposed on the work surface, the tool comprises: a frame having a support member extending therefrom; at least one extendable member disposed on the support member, wherein the extendable member is adapted to move in a linear direction; and one or more magnets disposed on the frame, wherein the one or more magnets have at least one contact side that is switchable between a magnetized state and a non-magnetized state; securing the tool to the work surface by switching at least one of the one or more magnets from the non-magnetized state to the magnetized state; and contacting the component with the extendable member.

In another embodiment, the method in the preceding paragraph 0079 further comprises connecting the component to the work surface.

Another embodiment can be the method in either of the preceding paragraphs 0079-0080, wherein connecting the component to the work surface comprises welding.

Another embodiment can be the method in any of the preceding paragraphs 0079-0081, wherein the one or more magnets comprise a housing, at least two permanent magnets and a lever for causing relative rotation of the permanent magnets.

In another embodiment, the method in any of the preceding paragraphs 0079-0082 further comprises retracting the extendable member and releasing the tool from the work surface by switching the one or more magnets in the magnetized state to the non-magnetized state.

Another embodiment can be the method in any of the preceding paragraphs 0079-0083, wherein the frame further comprises a first side and a second side, wherein the support member is disposed between the first side and the second side, a first magnet disposed on the first side; a second magnet disposed on the second side; and wherein the support member is perpendicular to the contact sides of the first magnet and the second magnet, and wherein the support member is linearly adjustable relative to the contact sides.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A portable tool for performing work on a work piece, comprising:
    a frame;
    a support member extending from the frame;
    at least one extendable member disposed on the support member, wherein the extendable member is adapted to move in a linear direction; and
    at least one magnet disposed on the frame, wherein the magnet has at least one contact side that is switchable between a magnetized state and a non-magnetized state, and wherein the magnet comprises a housing, at least two permanent magnets disposed within the housing, and a switch extending from the housing for causing relative rotation of the permanent magnets.

2. The portable tool of claim 1, wherein the extendable member comprises a drill bit.

3. The portable tool of claim 1, wherein the extendible member comprises a drill bit, and wherein the drill bit is rotatable by an electric motor.

4. The portable tool of claim 1, wherein the extendable member comprises a drill bit, and the portable tool further comprises a handle that when actuated causes the extendable member to move in the linear direction.

5. The portable tool of claim 1, wherein the support member is perpendicular to a longitudinal axis of the frame.

6. The portable tool of claim 1, wherein the support member is linearly adjustable along a longitudinal axis of the frame between a first end and a second end thereof.

7. The portable tool of claim 1, wherein the support member is disposed on the frame between a first end and a second end thereof, and wherein the magnet is disposed on or about the second end of the frame.

8. The portable tool of claim 1, wherein the support member is disposed on the frame between a first end and a second end thereof, wherein the magnet is disposed on or about the second end of the frame, and wherein the extendible member is adapted to move toward a plane perpendicular to the second end of the frame.

9. The portable tool of claim 1, wherein the extendable member comprises a hydraulically actuated bit or a pneumatically actuated bit.

10. The portable tool of claim 9, wherein the hydraulically actuated bit or the pneumatically actuated bit comprises a chisel, a cutter, a punch, or a hammer.

11. The portable tool of claim 1, wherein the support member is substantially parallel to the contact side of the magnet.

12. A method for performing work on a work piece, comprising:
    positioning a portable tool on or adjacent to a work surface to be worked, the tool comprising:
        a frame;
        a support member extending from the frame;
        at least one extendable member disposed on the support member, wherein the extendable member is adapted to move in a linear direction; and
        at least one magnet disposed on the frame, wherein the magnet has at least one contact side that is switchable between a magnetized state and a non-magnetized state, and wherein the magnet comprises a housing, at least two permanent magnets disposed within the housing, and a switch extending from the housing for causing relative rotation of the permanent magnets.

13. The method of claim 12, further comprising actuating the magnet to the magnetized state.

14. The method of claim 13, further comprising extending the extendable member to engage against the work surface.

15. The method of claim 14, further comprising actuating the magnet to the non-magnetized state.

16. The method of claim 12, wherein the extendable member comprises a drill bit and the method further comprises extending the extendable member to contact the work surface.

17. The method of claim 12, wherein the extendable member comprises a hydraulically actuated ram, a pneumatically actuated ram, an electrically actuated ram, or a drill bit, and the method further comprises extending the extendable member to contact the work surface.

18. A portable tool for performing work on a work piece, comprising:
   a frame;
   a support member disposed between a first end and a second end of the frame and extending therefrom, wherein the support member is linearly adjustable along a longitudinal axis of the frame between the first and second thereof;
   at least one extendable member disposed on the support member, wherein the extendable member is adapted to move in a linear direction, and wherein the extendible member comprises a drill bit that is rotatable by an electric motor; and
   at least one magnet disposed on the frame, wherein the magnet has at least one contact side that is switchable between a magnetized state and a non-magnetized state, and wherein the magnet comprises a housing, at least two permanent magnets disposed within the housing, and a switch extending from the housing for causing relative rotation of the permanent magnets.

19. The portable tool of claim 18, wherein the support member is substantially parallel to the contact side of the magnet.

20. The portable tool of claim 18, wherein a contact surface of the extendable member is substantially parallel to the contact side of the magnet.

* * * * *